（12） United States Patent
Tu et al.

(10) Patent No.: US 7,199,966 B1
(45) Date of Patent: Apr. 3, 2007

(54) DISK DRIVE ADJUSTING SEEK PROFILE FOR VARIABLE SEEK TIMES TO REDUCE POWER DISSIPATION

(75) Inventors: Kuang-Yang Tu, Irvine, CA (US); William T. Stoll, Chino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/168,268

(22) Filed: Jun. 28, 2005

(51) Int. Cl.
 *G11B 5/596* (2006.01)
(52) U.S. Cl. .................................. 360/78.06
(58) Field of Classification Search ............ None
 See application file for complete search history.

(56) References Cited

U.S. PATENT DOCUMENTS

| | | | |
|---|---|---|---|
| 5,119,250 A | 6/1992 | Green et al. | |
| 5,182,684 A * | 1/1993 | Thomas et al. | 360/78.09 |
| 5,268,804 A | 12/1993 | Wallis | |
| 5,657,179 A | 8/1997 | McKenzie | |
| 5,793,558 A | 8/1998 | Codilian et al. | |
| 6,038,096 A | 3/2000 | Zhang et al. | |
| 6,115,205 A | 9/2000 | Waugh et al. | |
| 6,163,430 A * | 12/2000 | Hansen | 360/78.06 |
| 6,195,222 B1 | 2/2001 | Heminger et al. | |
| 6,310,743 B1 | 10/2001 | Haines et al. | |
| 6,339,811 B1 | 1/2002 | Gaertner et al. | |
| 6,369,972 B1 | 4/2002 | Codilian et al. | |
| 6,418,510 B1 | 7/2002 | Lamberts | |
| 6,445,531 B1 | 9/2002 | Gaertner et al. | |
| 6,604,178 B1 | 8/2003 | Hall | |
| 6,744,590 B2 | 6/2004 | Chu et al. | |
| 6,754,036 B2 | 6/2004 | Dehnert | |
| 6,757,481 B1 | 6/2004 | Nazarian et al. | |
| 6,809,896 B2 | 10/2004 | Espeseth et al. | |
| 2002/0131195 A1 | 9/2002 | Dehnert | |
| 2003/0048571 A1 | 3/2003 | Soyama et al. | |
| 2003/0149837 A1 | 8/2003 | Coker et al. | |
| 2004/0233569 A1 | 11/2004 | Chung | |

OTHER PUBLICATIONS

"Optimal Seek-Speed versus Power Tradeoff in Disk File Systems", IBM Technical Disclosure Bulletin, Jun. 1995, pp. 323-324.
"Optimal Seek-Speed versus Power Tradeoff in Disk File Systems", IBM Technical Disclosure Bulletin, Jun. 1995, pp. 323-324.

* cited by examiner

*Primary Examiner*—K. Wong
(74) *Attorney, Agent, or Firm*—Howard H. Sheerin, Esq.

(57) ABSTRACT

A disk drive is disclosed comprising a disk having a plurality of tracks, a head actuated over the disk, and a voice coil motor for seeking the head from a first track to a second track. A first seek time is computed corresponding to a first seek profile, and second seek time is computed which is greater than the first seek time. A second seek profile is computed in response to the first seek time, the second seek time, and a scaling factor that accounts for a back EMF voltage generated by the voice coil motor. The voice coil motor is then controlled according to the second seek profile to seek the head from the first track to the second track.

28 Claims, 7 Drawing Sheets

DISK DRIVE ADJUSTING SEEK PROFILE FOR VARIABLE SEEK TIMES TO REDUCE POWER DISSIPATION

BACKGROUND OF THE INVENTION

1. Field of the Invention

The present invention relates to disk drives. More particularly, the present invention relates to a disk drive employing adjustable seek profiles for variable seek times to reduce power dissipation.

2. Description of the Prior Art

Figure 1A:
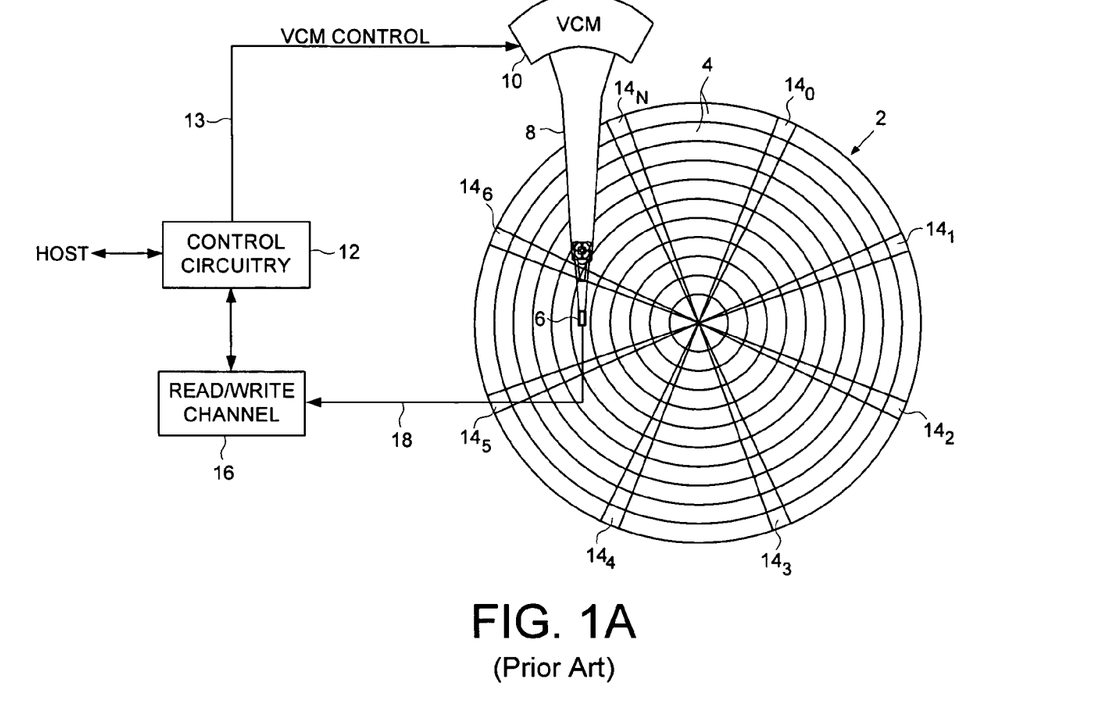
FIG. 1A shows a prior art disk drive comprising control circuitry for seeking a head to a target track on a disk by controlling a voice coil motor.

FIG. 1A shows a prior art disk drive comprising a disk 2 having a plurality of tracks 4 which are partitioned into a number of data sectors. A head 6 coupled to a distal end of an actuator arm 8 is actuated over the disk 2 to access a target data sector by rotating the actuator arm 8 about a pivot in a seek operation. The disk drive typically employs a voice coil motor (VCM) 10 for rotating the actuator arm 8 about the pivot by energizing a voice coil with current. Control circuitry 12 generates a VCM control signal 13 applied to the VCM 10 according to a predetermined seek profile. During at least part of the seek operation, the control circuitry 12 implements a closed-loop servo system in response to the position of the head 6 as determined from position information (e.g., track address and servo bursts) recorded in embedded servo sectors $14_0$–$14_N$. A read channel 16 processes the read signal 18 emanating from the head 6 in order to demodulate the position information recorded in the embedded servo sectors $14_0$–$14_N$.

Figure 1B:
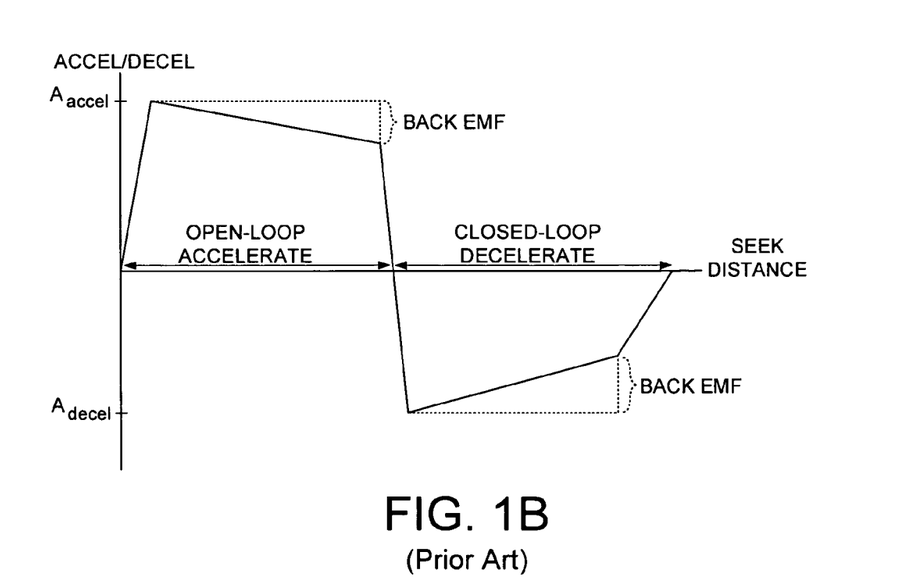
FIG. 1B shows a prior art acceleration/deceleration seek profile used by the control circuitry to perform the seek operation.

The ability of the VCM 10 to follow a predetermined seek profile depends on the acceleration/deceleration capability of the VCM 10 as controlled by the magnitude of current energizing the voice coil. Aggressive seek profiles require aggressive acceleration/deceleration currents which increases the heat and mechanical stress on the VCM, as well as increases power dissipation. FIG. 1B shows a prior art seek profile during the seek operation wherein the control circuitry 12 generates the VCM control signal 13 to apply a saturated acceleration current to the voice coil in order to accelerate the actuator arm 8 open-loop. The magnitude ($A_{accel}$) of the saturated acceleration current is limited by the supply voltage, VCM coil resistance, and the VCM driver voltage drops and resistances. In addition, as the back EMF voltage of the VCM increases with increasing velocity, there is a corresponding decrease in the saturated acceleration current as shown in FIG. 1B. During deceleration, the control circuitry 12 generates the VCM control signal 13 to control the velocity of the actuator arm 8 in a closed-loop system to follow a predetermined velocity/distance deceleration profile (described below with reference to FIG. 6). An aggressive deceleration profile is typically selected relative to the deceleration capability of the VCM 10 in order to minimize the seek time. The maximum deceleration current is also a function of the back EMF voltage which decreases with decreasing velocity as illustrated in FIG. 1B. Under certain conditions, it may be unnecessary to minimize seek times using aggressive seek profiles. For example, if the disk drive disables predictive caching, less aggressive seek profiles may be employed in order to reduce VCM heating and power dissipation.

There is, therefore, a need to adjust the seek profile in a disk drive to accommodate variable seek times.

SUMMARY OF THE INVENTION

The present invention may be regarded as a disk drive comprising as disk having a plurality of tracks, an actuator arm, a head connected to a distal end of the actuator arm, a voice coil motor for rotating the actuator arm about a pivot to actuate the head over the disk, and control circuitry for controlling the voice coil motor during a seek operation to seek the head from a first track to a second track. The control circuitry computes a first seek time corresponding to a first seek profile, and computes a second seek time greater than the first seek time. A second seek profile is computed in response to the first seek time, the second seek time, and a scaling factor that accounts for a back EMF voltage generated by the voice coil motor. The control circuitry then controls the voice coil motor according to the second seek profile to seek the head from the first track to the second track.

In one embodiment, the first seek profile comprises a first open-loop acceleration command, and the second seek profile comprises a second open-loop acceleration command generated by scaling the first open-loop acceleration command. In one embodiment, the first open-loop acceleration command corresponds to a saturation current of the voice coil motor.

In yet another embodiment, the first seek profile comprises a first closed-loop deceleration command, and the second seek profile comprises a second closed-loop deceleration command generated by scaling the first closed-loop deceleration command.

In another embodiment, the second open-loop acceleration command is computed according to $$\frac{A_{accel}}{(T'/T)^2 \cdot S_f}$$

wherein:
  $A_{accel}$ is the first open-loop acceleration command;
  T is the first seek time;
  T' is the second seek time; and
  $S_f$ is a scaling factor.

In one embodiment, the scaling factor is computed as a function of the first seek time, the second seek time, and a seek distance. In one embodiment, the scaling factor is computed according to:

$$S_f = 1 + [(T'/T)^2 - 1] \cdot \text{Slope\_min}$$

wherein Slope_min is a calibrated scalar. In one embodiment, Slope_min is calibrated by performing multiple seeks for a predetermined seek distance and adjusting Slope_min until the actual seek time to complete the seek operation substantially equals the second seek time T'. In yet another embodiment, Slope_min is calibrated by calibrating a plurality of slope values corresponding to a plurality of different seek times T', wherein each slope value selected so that the actual seek time substantially equals the corresponding seek time T', and selecting Slope_min as the minimum slope value out of the plurality of slope values.

In yet another embodiment, the second closed-loop deceleration command is computed according to similar equations using the same or different scaling factor.

The present invention may also be regarded as a method of operating a disk drive, the disk drive comprising a disk having a plurality of tracks, an actuator arm, a head connected to a distal end of the actuator arm, and a voice coil motor for rotating the actuator arm about a pivot to actuate the head over the disk. A first seek time is computed corresponding to a first seek profile, and a second seek time is computed which is greater than the first seek time. A second seek profile is computed in response to the first seek time, the second seek time, and a scaling factor that accounts for a back EMF voltage generated by the voice coil motor. The voice coil motor is controlled according to the second seek profile to seek the head from a first track to a second track.

DESCRIPTION OF THE PREFERRED EMBODIMENTS

Figure 2:
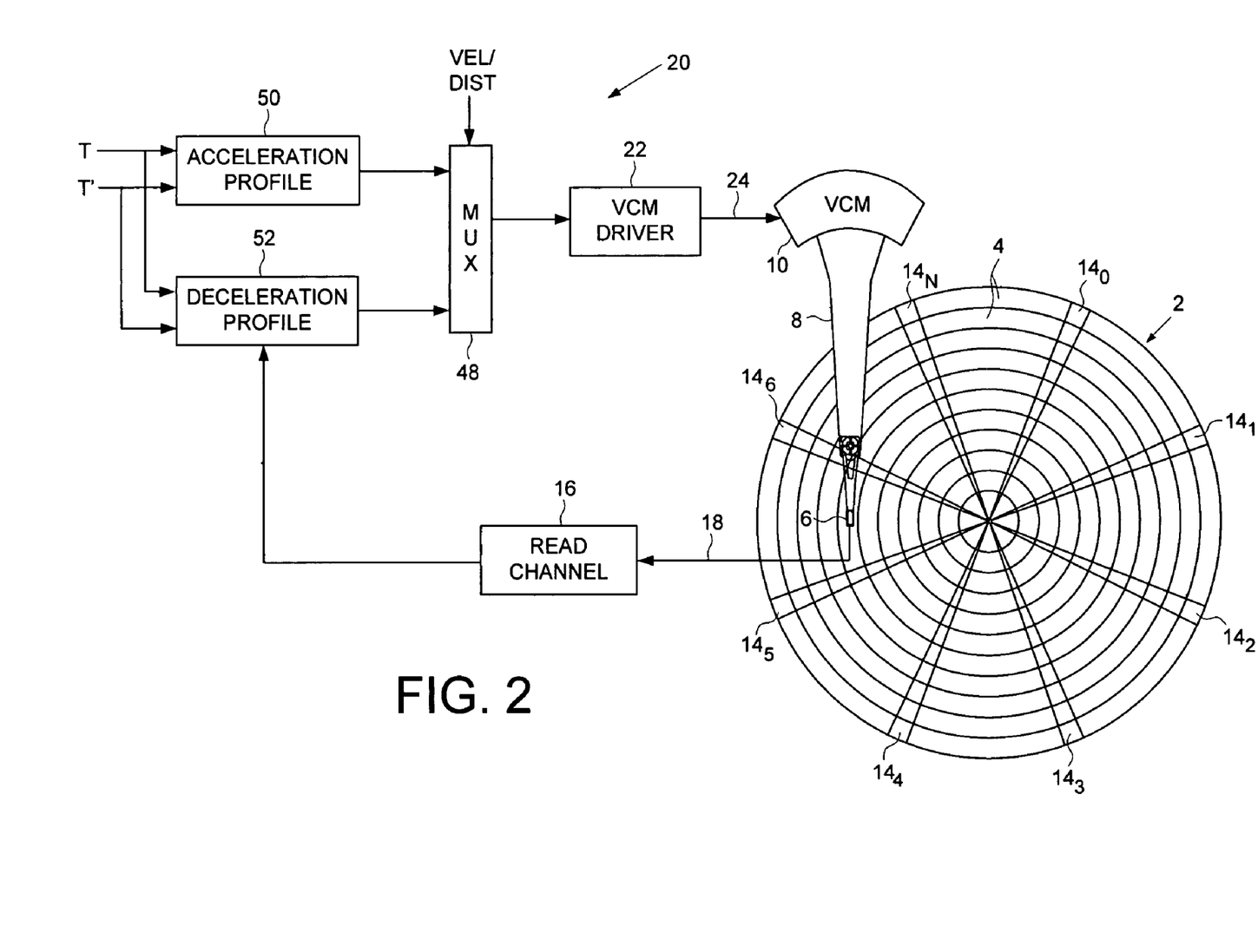
FIG. 2 shows a disk drive according to an embodiment of the present invention comprising control circuitry for performing a seek operation according to an adjusted seek time by computing a seek profile in response to the adjusted seek time and a scaling factor that accounts for a back EMF voltage generated by the voice coil motor.

FIG. 2 shows a disk drive according to an embodiment of the present invention comprising as disk 2 having a plurality of tracks 4, an actuator arm 8, a head 6 connected to a distal end of the actuator arm 8, a voice coil motor (VCM) 10 for rotating the actuator arm 8 about a pivot to actuate the head 6 over the disk 2, and control circuitry 20 for controlling the VCM 10 during a seek operation to seek the head 6 from a first track to a second track. The control circuitry 20 computes a first seek time T corresponding to a first seek profile, and computes a second seek time T' greater than the first seek time. A second seek profile is computed in response to the first seek time T, the second seek time T', and a scaling factor that accounts for a back EMF voltage generated by the VCM 10. The control circuitry 20 then controls the VCM 10 according to the second seek profile to seek the head 6 from the first track to the second track. In the embodiment of FIG. 2, a plurality of embedded servo sectors $14_0$–$14_N$ are written to the disk 2 to facilitate positioning the head 6 over a target track. As the head 6 passes over a servo sector 14, a read/write channel 16 processes the read signal 18 to demodulate the servo data (e.g., track address and servo bursts) to derive a radial location of the head 6. During read/write operations, the control circuitry 20 compares the actual position of the head 6 to a target position to generate a position error signal (PES). The control circuitry 20 processes the PES signal to generate an acceleration/deceleration command for a VCM driver 22 which generates a control signal 24 applied to the VCM 10 in order to maintain the head 6 over the centerline of the target track. During seek operations, the radial location of the head 6 determined by reading the embedded servo sectors $14_0$–$14_N$ provides feedback for closed-loop control, for example, while decelerating the actuator arm 8 according to a velocity/distance deceleration profile.

Figure 3A:
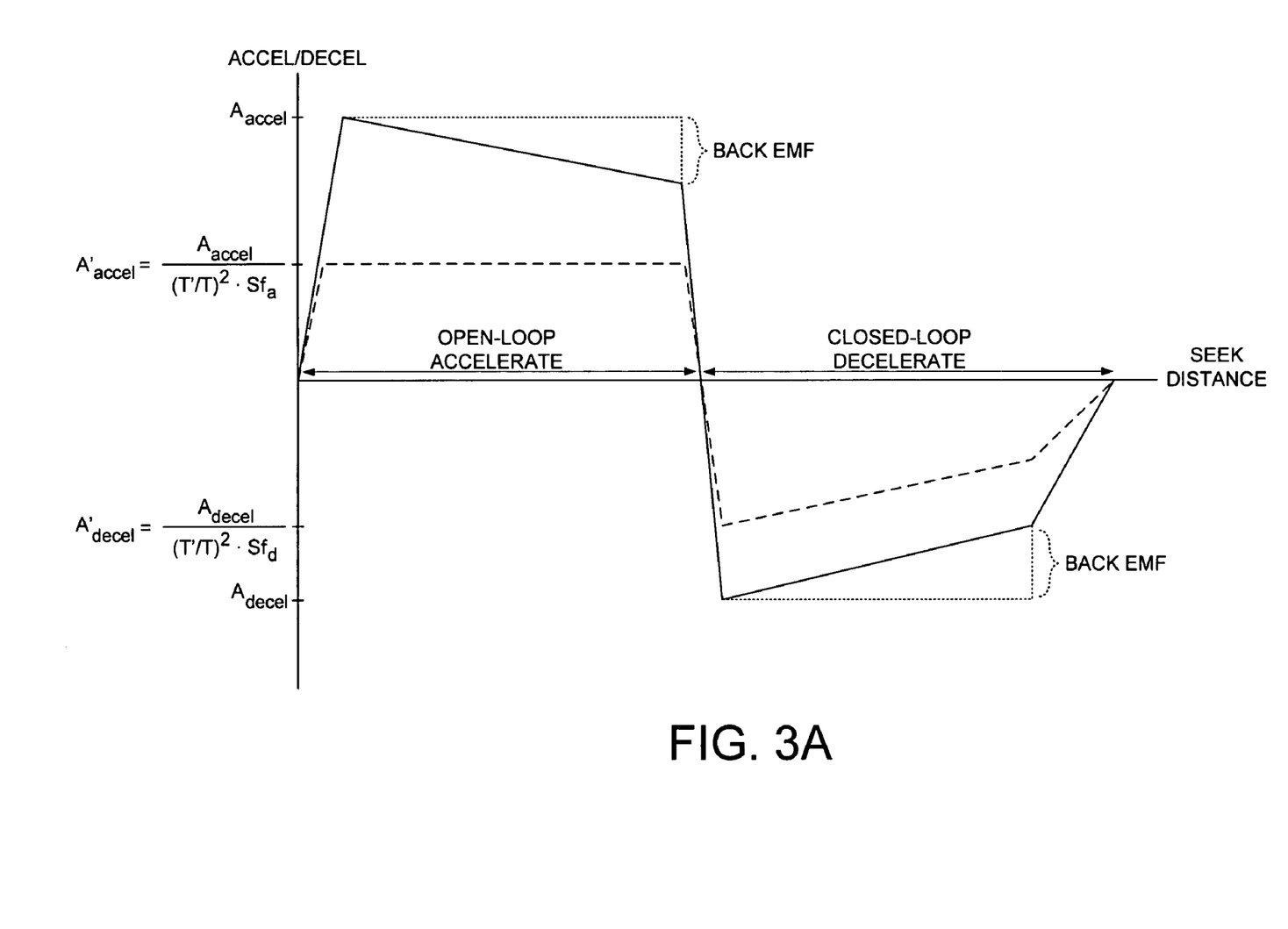
FIG. 3A shows an aggressive seek profile for minimizing the seek time and an adjusted seek profile according to an increased seek time to reduce acoustic noise and power dissipation of the voice coil motor.

FIG. 3A shows acceleration/deceleration seek profiles according to an embodiment of the present invention, including a first seek profile (solid line) corresponding to the first seek time T (fast seek), and a second seek profile (dashed line) corresponding to the second seek time T' (slower seek). In this embodiment, the acceleration part of the seek profile is performed open-loop meaning the control circuitry 20 generates a first open-loop acceleration command to accelerate the head 6 toward the target track according to the first seek time T. Also in the embodiment of FIG. 3A, the first open-loop acceleration command corresponds to a saturation current of the VCM 10. As the VCM 10 accelerates, the resulting back EMF voltage causes the magnitude of the saturation current to decrease. During the acceleration part of the second seek profile (dashed line), the control circuitry 20 generates a second open-loop acceleration command by scaling the first open-loop acceleration command. To account for the effect of the back EMF voltage, the control circuitry 20 generates the second open-loop acceleration command according to:

$$\frac{A_{accel}}{(T'/T)^2 \cdot S_f}$$

wherein:

$A_{accel}$ is the first open-loop acceleration command;

T is the first seek time;

T' is the second seek time; and $S_f$ is a scaling factor.

Referring again to the embodiment of FIG. 3A, the deceleration part of the seek profile is performed closed-loop meaning the control circuitry 20 generates a first closed-loop deceleration command to decelerate the head 6 toward the target track according to the first seek time T. In one embodiment, the first closed-loop deceleration command is maximized without saturating the deceleration current to decelerate the head 6 as quickly as possible according to a velocity/distance deceleration profile. Accordingly, as shown in FIG. 3A the deceleration seek profile is shaped to account for the back EMF voltage generated by the VCM 10 which decrease as the velocity decreases. During the deceleration part of the second seek profile (dashed line), the control circuitry 20 generates a second closed-loop deceleration command by scaling the first closed-loop deceleration command. To account for the effect of the back EMF voltage, the control circuitry 20 generates the second closed-loop deceleration command according to:

$$\frac{A_{decel}}{(T'/T)^2 \cdot S_f}$$

wherein:

$A_{decel}$ is the first closed-loop deceleration command;

T is the first seek time;

T' is the second seek time; and $S_f$ is a scaling factor.

Any suitable seek profile may be used in the embodiments of the present invention. In addition, the acceleration and deceleration parts of the seek profile may be scaled in any desirable manner to achieve the target seek time. In one embodiment, the acceleration and deceleration part of the seek profile are scaled equally to provide the best performance in terms of acoustic noise and power dissipation. If the acceleration and deceleration parts of seek profile are substantially symmetric, then a single scaling factor $S_f$ may be used to scale the acceleration and deceleration profiles. In an alternative embodiment, a separate scaling factor $S_f$ ($S_{fa}$ and $S_{fd}$ in FIG. 3A) is used to scale the acceleration and deceleration profiles to account for asymmetry, or to bias the adjustment of the acceleration or deceleration profiles independently.

Figure 3B:
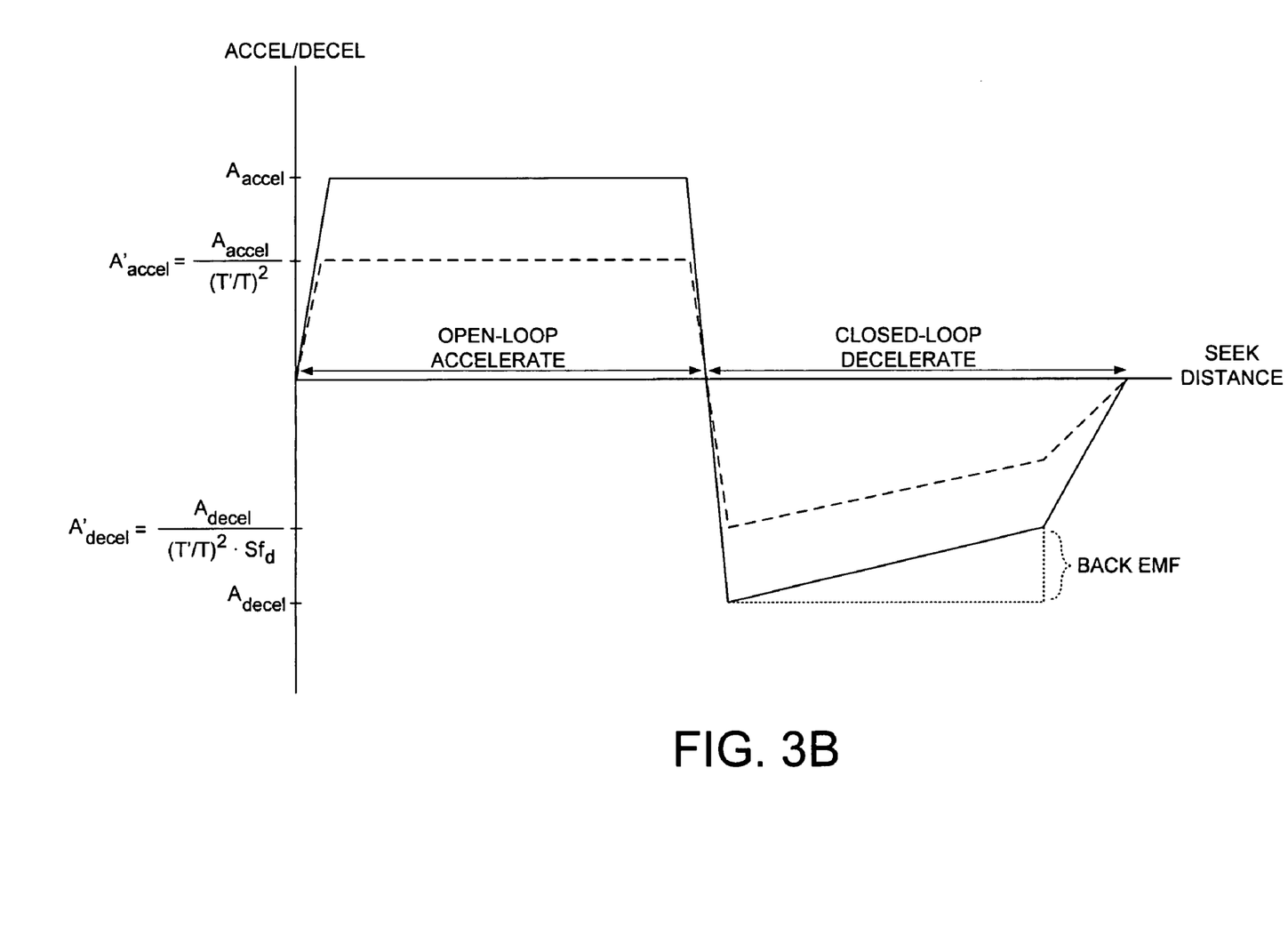
FIG. 3B shows a seek profile according to an embodiment of the present invention wherein the acceleration current is not saturated (not affected by the back EMF voltage) so that only the deceleration current is adjusted according to the scaling factor.

In another embodiment shown in FIG. 3B, the acceleration part of the first seek profile (solid line) corresponds to a first open-loop acceleration command that does not saturate the current of the VCM 10. In this embodiment, the control circuitry 20 generates the second open-loop acceleration command using a unity scaling factor $S_f$ since the back EMF voltage generated by the VCM 10 does not affect the acceleration current. In an alternative embodiment, the acceleration seek profile is shaped similar to the deceleration seek profile in order to accelerate as fast as possible without saturating the VCM current (essentially tracking the back EMF voltage shown in FIG. 3A), thereby requiring an appropriate non-unity scaling factor $S_f$ to generate the second open-loop acceleration command. Similarly in the embodiment of FIG. 3B, the deceleration seek profile is shaped to account for the back EMF voltage to decelerate as fast as possible without saturating the VCM current. Therefore, the control circuitry 20 generates the second closed-loop deceleration command using an appropriate non-unity scaling factor $S_f$.

In one embodiment, the scaling factor $S_f$ is computed as a function of the first seek time T, the second seek time T', and a seek distance. In one embodiment, the scaling factor is computed according to:

$$S_f = 1 + [(T'/T)^2 - 1] \cdot \text{Slope\_min}$$

wherein Slope_min is a calibrated scalar. In one embodiment, Slope_min is calibrated by performing multiple seeks for a predetermined seek distance and adjusting Slope_min until the actual seek time to complete the seek operation substantially equals the second seek time T' (slower seek). In yet another embodiment, Slope_min is calibrated by calibrating a plurality of slope values corresponding to a plurality of different seek times T', wherein each slope value selected so that the actual seek time substantially equals the corresponding seek time T', and selecting Slope_min as the minimum slope value out of the plurality of slope values.

Figure 4:
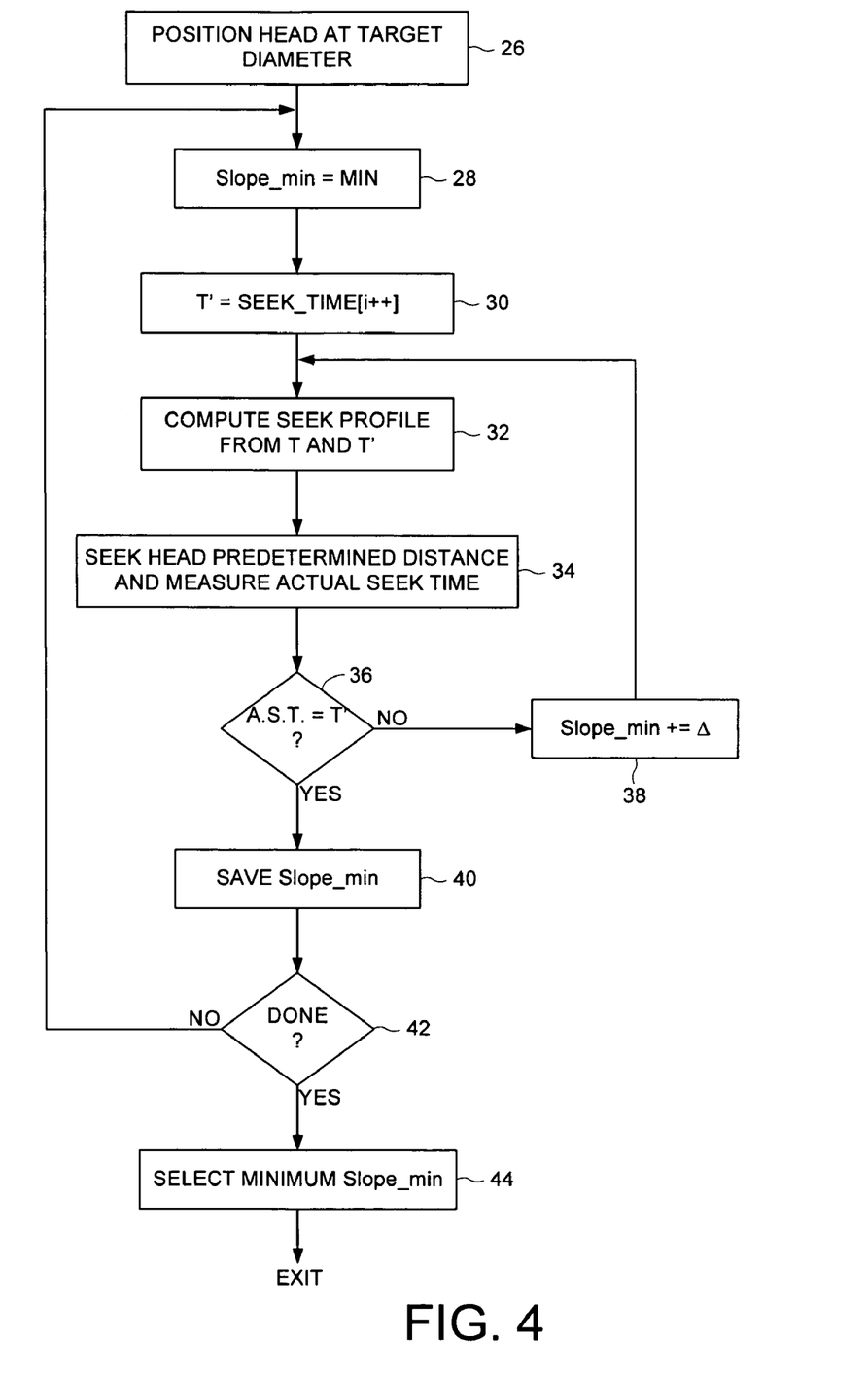
FIG. 4 is a flow diagram according to an embodiment of the present invention for generating a scalar used to compute the scaling factor for adjusting the seek profile.

This embodiment is illustrated in the flow diagram of FIG. 4 wherein at step 26 the head 6 is positioned at a target diameter of the disk 2 (e.g., middle diameter). At step 28 the Slope_min scalar is initialized to a minimum value, and at step 30 a seek time is assigned to the second seek time T'. At step 32 the seek profile is computed from the first seek time T and the second seek time T'. At step 34 a seek is performed to seek the head 6 a predetermined distance (e.g., one-third stroke) and the actual seek time is measured. If at step 36 the actual seek time (AST) does not substantially equal the second seek time T', then at step 38 the Slope_min scalar is incremented by a predetermined delta, and the process is repeated from step 32. If at step 36 the actual seek time (AST) does substantially equal the second seek time T', then at step 40 the current value for the Slope_min scalar is saved. This process is then repeated starting at step 28 wherein a different seek time is assigned to the second seek time T', and the corresponding Slope_min value that generates the new seek time is saved at step 40. After performing this process for a number of different seek times, at step 44 the minimum Slope_min value out of those saved at step 40 is selected and used during normal operation of the disk drive.

Figure 5A:
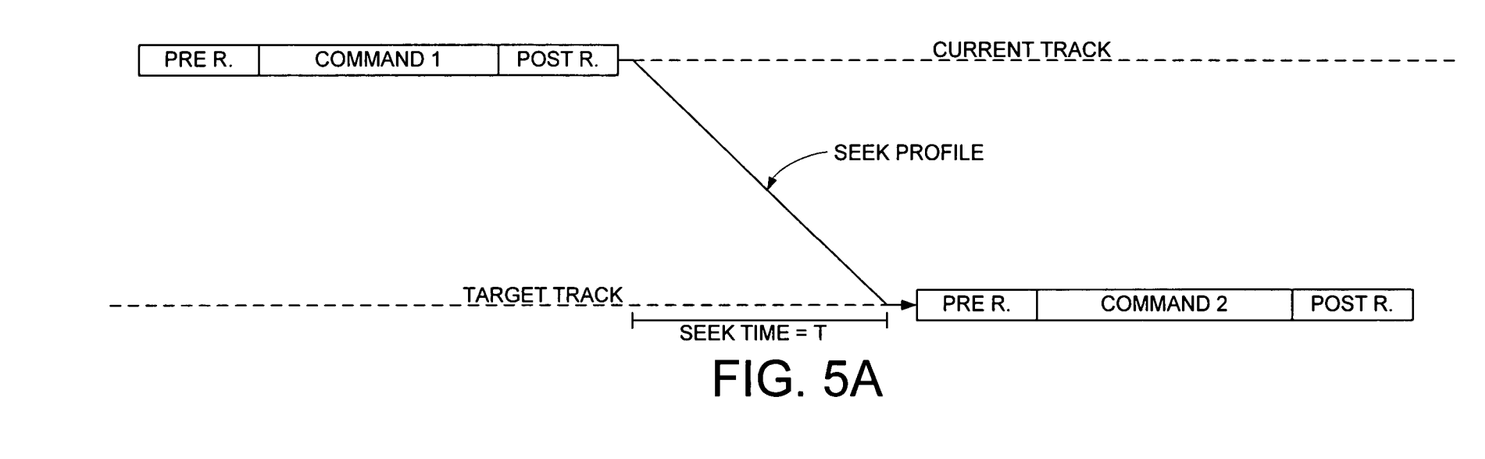
FIGS. 5A and 5B illustrate an embodiment of the present invention wherein predictive caching is disabled allowing the seek times to be increased in order to reduce acoustic noise and power dissipation of the voice coil motor.
Figure 5B:
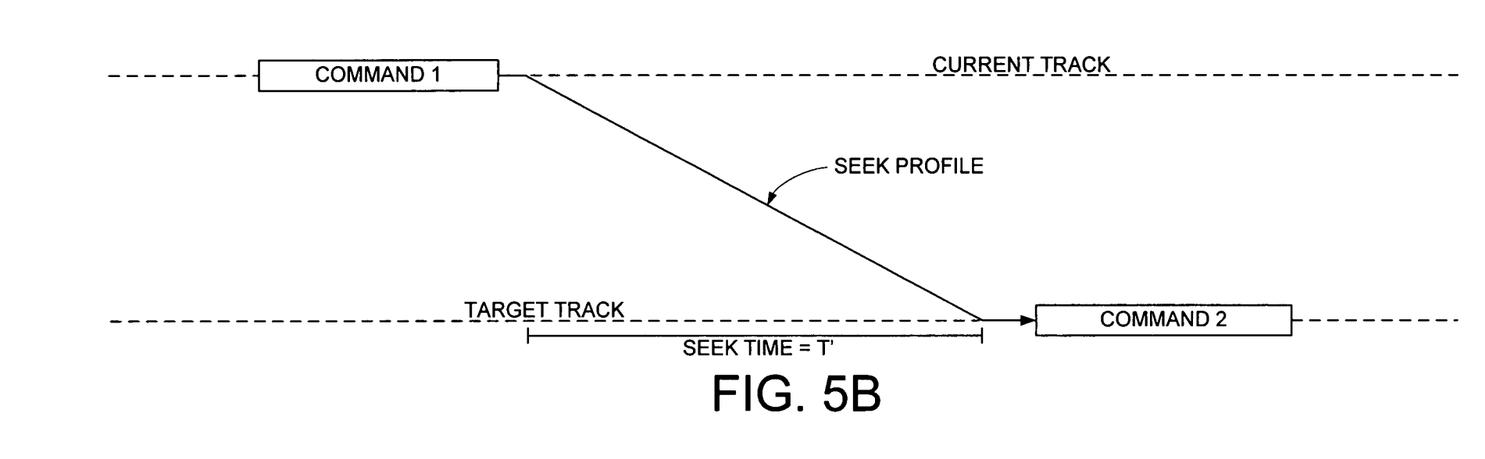

FIG. 5A illustrates an embodiment of the present invention wherein the disk drive performs predictive caching by storing in a cache memory a number of data sectors preceding (PRE R.) and following (POST R.) a read command. Predictive caching enhances performance by decreasing access time if subsequent host commands can be serviced from the cache memory rather than accessing the disk. As illustrated in FIG. 5A, predictive caching typically requires the use of a more aggressive seek profile corresponding to the first seek time T (fast seek). If during operation the control circuitry 20 determines that the benefit of predictive caching is minimal (e.g., the number of cache hits is small), then predictive caching is disable in order to allow a less aggressive seek profile and slower seek time T' as illustrated in FIG. 5B. The slower seek time T' reduces the acoustic noise and power dissipation of the VCM 10.

Figure 6:
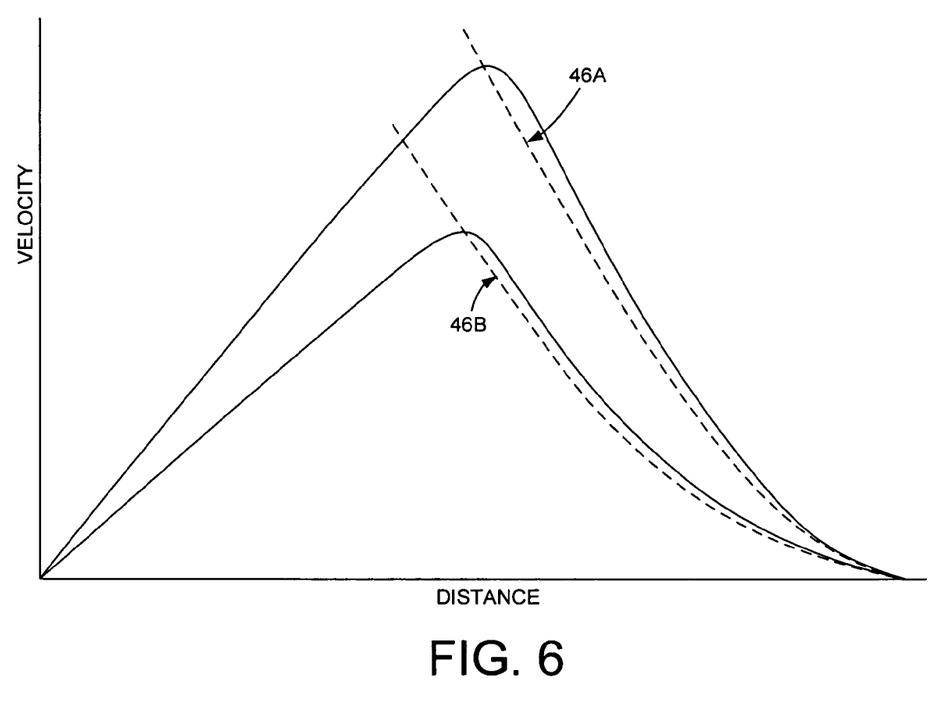
FIG. 6 shows two velocity/distance deceleration profiles for decelerating the head closed-loop according to two different seek times.

FIG. 6 shows velocity/distance deceleration profiles according to an embodiment of the present invention, including a first deceleration profile 46A corresponding to the first seek time T (fast seek) and a second deceleration profile 46B corresponding to the second seek time T' (slower seek). Referring again to the embodiment of FIG. 2, during the acceleration part of the seek a multiplexer 48 applies an acceleration command to the VCM driver 22 generated by acceleration profile circuitry 50. The acceleration profile circuitry 50 generates the open-loop acceleration command in response to the first and second seek times T and T' as describe above. When the velocity/distance of the head 6 reaches the corresponding point of the deceleration profile shown in FIG. 6, the multiplexer 48 applies a closed-loop deceleration command to the VCM driver 22 generated by deceleration profile circuitry 52. The deceleration profile circuitry 52 generates the closed-loop deceleration command in response to the first and second seek times T and T' as described above, as well as the current velocity/distance of the head 6 as determined from reading the embedded servo sectors $14_0$–$14_N$. In one embodiment, the deceleration profile circuitry 52 computes a target deceleration profile (such as shown in FIG. 6) in response to the first and second seek times T and T'. During the deceleration part of the seek, the deceleration profile circuitry 52 generates the closed-loop deceleration command in response to the deviation of the actual velocity/distance of the head 6 from the target deceleration profile.

We claim:

1. A disk drive comprising:

(a) a disk comprising a plurality of tracks;

(b) an actuator arm;

(c) a head connected to a distal end of the actuator arm;
(d) a voice coil motor for rotating the actuator arm about a pivot to actuate the head over the disk; and
(d) control circuitry for controlling the voice coil motor during a seek operation to seek the head from a first track to a second track by:
  computing a first seek time corresponding to a first seek profile;
  computing a second seek time greater than the first seek time;
  computing a second seek profile in response to the first seek time, the second seek time, and a scaling factor that accounts for a back EMF voltage generated by the voice coil motor; and
  controlling the voice coil motor according to the second seek profile to seek the head from the first track to the second track.

2. The disk drive as recited in claim 1, wherein:
(a) the first seek profile comprises a first open-loop acceleration command; and
(b) the second seek profile comprises a second open-loop acceleration command generated by scaling the first open-loop acceleration command.

3. The disk drive as recited in claim 2, wherein the first open-loop acceleration command corresponds to a saturation current of the voice coil motor.

4. The disk drive as recited in claim 1, wherein:
(a) the first seek profile comprises a first closed-loop deceleration command; and
(b) the second seek profile comprises a second closed-loop deceleration command generated by scaling the first closed-loop deceleration command.

5. The disk drive as recited in claim 2, wherein the second open-loop acceleration command is computed according to:

$$\frac{A_{accel}}{(T'/T)^2 \cdot S_f}$$

wherein:
$A_{accel}$ is the first open-loop acceleration command;
T is the first seek time;
T' is the second seek time; and
$S_f$ is a scaling factor.

6. The disk drive as recited in claim 5, wherein the scaling factor is computed as a function of the first seek time, the second seek time, and a seek distance.

7. The disk drive as recited in claim 6, wherein the scaling factor is computed according to:

$$S_f = 1 + [(T'/T)^2 - 1] \cdot \text{Slope\_min}$$

wherein Slope_min is a calibrated scalar.

8. The disk drive as recited in claim 7, wherein Slope_min is calibrated by performing multiple seeks for a predetermined seek distance and adjusting Slope_min until the actual seek time to complete the seek operation substantially equals the second seek time T'.

9. The disk drive as recited in claim 8, wherein Slope_min is calibrated by:
(a) calibrating a plurality of slope values corresponding to a plurality of different seek times T', wherein each slope value selected so that the actual seek time substantially equals the corresponding seek time T'; and
(b) selecting Slope_min as the minimum slope value out of the plurality of slope values.

10. The disk drive as recited in claim 4, wherein the second closed-loop deceleration command is computed according to:

$$\frac{A_{decel}}{(T'/T)^2 \cdot S_f}$$

wherein:
$A_{decel}$ is the first closed-loop deceleration command;
T is the first seek time;
T' is the second seek time; and
$S_f$ is a scaling factor.

11. The disk drive as recited in claim 10, wherein the scaling factor is computed as a function of the first seek time, the second seek time, and a seek distance.

12. The disk drive as recited in claim 11, wherein the scaling factor is computed according to:

$$S_f = 1 + [(T'/T)^2 - 1] \cdot \text{Slope\_min}$$

wherein Slope_min is a calibrated scalar.

13. The disk drive as recited in claim 12, wherein Slope_min is calibrated by performing multiple seeks for a predetermined seek distance and adjusting Slope_min until the actual seek time to complete the seek operation substantially equals the second seek time T'.

14. The disk drive as recited in claim 13, wherein Slope_min is calibrated by:
(a) calibrating a plurality of slope values corresponding to a plurality of different seek times T', wherein each slope value selected so that the actual seek time substantially equals the corresponding seek time T'; and
(b) selecting Slope_min as the minimum slope value out of the plurality of slope values.

15. A method of operating a disk drive, the disk drive comprising a disk having a plurality of tracks, an actuator arm, a head connected to a distal end of the actuator arm, and a voice coil motor for rotating the actuator arm about a pivot to actuate the head over the disk, the method comprising the steps of:
(a) computing a first seek time corresponding to a first seek profile;
(b) computing a second seek time greater than the first seek time;
(c) computing a second seek profile in response to the first seek time, the second seek time, and a scaling factor that accounts for a back EMF voltage generated by the voice coil motor; and
(d) controlling the voice coil motor according to the second seek profile to seek the head from a first track to a second track.

16. The method as recited in claim 15, wherein:
(a) the first seek profile comprises a first open-loop acceleration command; and
(b) the second seek profile comprises a second open-loop acceleration command generated by scaling the first open-loop acceleration command.

17. The method as recited in claim 16, wherein the first open-loop acceleration command corresponds to a saturation current of the voice coil motor.

18. The method as recited in claim 15, wherein:
(a) the first seek profile comprises a first closed-loop deceleration command; and
(b) the second seek profile comprises a second closed-loop deceleration command generated by scaling the first closed-loop deceleration command.

19. The method as recited in claim 16, wherein the second open-loop acceleration command is computed according to:

$$\frac{A_{accel}}{(T'/T)^2 \cdot S_f}$$

wherein:
   $A_{accel}$ is the first open-loop acceleration command;
   T is the first seek time;
   T' is the second seek time; and
   $S_f$ is a scaling factor.

20. The method as recited in claim 19, wherein the scaling factor is computed as a function of the first seek time, the second seek time, and a seek distance.

21. The method as recited in claim 20, wherein the scaling factor is computed according to:

$$S_f = 1 + [(T'/T)^2 - 1] \cdot \text{Slope\_min}$$

wherein Slope_min is a calibrated scalar.

22. The method as recited in claim 21, wherein Slope_min is calibrated by performing multiple seeks for a predetermined seek distance and adjusting Slope_min until the actual seek time to complete the seek operation substantially equals the second seek time T'.

23. The method as recited in claim 22, wherein Slope_min is calibrated by:
   (a) calibrating a plurality of slope values corresponding to a plurality of different seek times T', wherein each slope value selected so that the actual seek time substantially equals the corresponding seek time T'; and
   (b) selecting Slope_min as the minimum slope value out of the plurality of slope values.

24. The method as recited in claim 18, wherein the second closed-loop deceleration command is computed according to:

$$\frac{A_{decel}}{(T'/T)^2 \cdot S_f}$$

wherein:
   $A_{decel}$ is the first closed-loop deceleration command;
   T is the first seek time;
   T' is the second seek time; and
   $S_f$ is a scaling factor.

25. The method as recited in claim 24, wherein the scaling factor is computed as a function of the first seek time, the second seek time, and a seek distance.

26. The method as recited in claim 25, wherein the scaling factor is computed according to:

$$S_f = 1 + [(T'/T)^2 - 1] \cdot \text{Slope\_min}$$

wherein Slope_min is a calibrated scalar.

27. The method as recited in claim 26, wherein Slope_min is calibrated by performing multiple seeks for a predetermined seek distance and adjusting Slope_min until the actual seek time to complete the seek operation substantially equals the second seek time T'.

28. The method as recited in claim 27, wherein Slope_min is calibrated by:
   (a) calibrating a plurality of slope values corresponding to a plurality of different seek times T', wherein each slope value selected so that the actual seek time substantially equals the corresponding seek time T'; and
   (b) selecting Slope_min as the minimum slope value out of the plurality of slope values.

* * * * *